(12) United States Patent
Shtar et al.

(10) Patent No.: US 12,705,339 B2
(45) Date of Patent: Aug. 11, 2026

(54) ADAPTIVE WINDOW SCREENING FOR LARGE TEXT CONTENT SECURITY

(71) Applicant: Intuit Inc., Mountain View, CA (US)

(72) Inventors: Guy Shtar, Ness Ziona (IL); Jonathan Alexander Rabin, Kfar Saba (IL); Ron Bitton, Hod Hasharon (IL); Andrew Jacques Conegliano, San Francisco, CA (US)

(73) Assignee: Intuit Inc., Mountain View, CA (US)

( * ) Notice: Subject to any disclaimer, the term of this patent is extended or adjusted under 35 U.S.C. 154(b) by 7 days.

(21) Appl. No.: 18/991,140

(22) Filed: Dec. 20, 2024

(65) Prior Publication Data

US 2026/0178727 A1 Jun. 25, 2026

(51) Int. Cl.

| | |
|---|---|
| ***G06F 21/55*** | (2013.01) |
| ***G06F 21/50*** | (2013.01) |
| ***G06F 21/56*** | (2013.01) |
| ***G06F 40/10*** | (2020.01) |
| ***G06F 40/166*** | (2020.01) |

(Continued)

(52) U.S. Cl.

CPC .............. *G06F 21/55* (2013.01); *G06F 21/50* (2013.01); *G06F 21/566* (2013.01); *G06F 40/10* (2020.01); *G06F 40/166* (2020.01); *H04L 63/12* (2013.01); *G06F 21/577* (2013.01)

(58) Field of Classification Search

CPC ........ G06F 21/55; G06F 21/50; G06F 21/562; G06F 21/566; G06F 21/577; G06F 40/166; G06F 40/10; G06F 40/131; G06F 40/20; G06F 16/33; G06F 16/80; G06F 16/93; G06F 16/95; G06F 16/9536; H04L 63/12; H04L 63/10

See application file for complete search history.

(56) References Cited

U.S. PATENT DOCUMENTS

| | | | |
|---|---|---|---|
| 8,583,683 | B2 | 11/2013 | Rathod |
| 9,342,794 | B2 | 5/2016 | Mahler et al. |
| 9,552,548 | B1 | 1/2017 | Brestoff |

(Continued)

OTHER PUBLICATIONS

Thomas Mikolov et al., "Efficient Estimation of Word Representations in Vector Space," arXiv:1301.3781v3 [cs.CL] Sep. 7, 2013, 12 pages.

(Continued)

*Primary Examiner* — Shaqueal D Wade-Wright
(74) *Attorney, Agent, or Firm* — Paradice & Li LLP

(57) ABSTRACT

Systems and methods are disclosed for detecting and remediating safety issues in electronic text received by an electronic platform. The electronic text is screened using an adaptive text window that splits the text into segments. Each segment is tested for safety issues, e.g., for content moderation or computer security. Any segment that is identified as containing a potential safety issue is iteratively split and tested using progressively smaller window sizes. The testing of the segments includes generating a safety score, e.g., using a content safety model, which is compared to an adaptive threshold. The threshold may be adjusted in each iteration based on the change in window size. The dynamic screening approach continues until all segments are determined to be safe or until a minimum window size is reached and the electronic text is accepted or rejected based on the safety scores for the segments of the electronic text.

18 Claims, 4 Drawing Sheets

(51) Int. Cl.
*H04L 9/40* (2022.01)
*G06F 21/57* (2013.01)

(56) References Cited

U.S. PATENT DOCUMENTS

| | | | | |
|---|---|---|---|---|
| 10,171,481 | B2 * | 1/2019 | Childress | H04L 51/226 |
| 10,356,024 | B2 | 7/2019 | Kanter et al. | |
| 10,515,125 | B1 * | 12/2019 | Lavergne | G06F 16/93 |
| 11,106,718 | B2 * | 8/2021 | Krasadakis | G06F 40/35 |
| 11,157,633 | B1 * | 10/2021 | Verma | H04L 9/3247 |
| 12,130,917 | B1 * | 10/2024 | Yeung | G06F 21/56 |
| 2006/0069678 | A1 | 3/2006 | Chou et al. | |
| 2021/0279420 | A1 * | 9/2021 | Jain | G06V 30/414 |

OTHER PUBLICATIONS

Deepak Kumar et al., "Watch Your Language: Investigating Content Moderation with Large Language Models," arXiv:2309.14517v2 [cs.HC] Jan. 17, 2024, 12 pages.

Thodoris Lykouris et al., "Learning to Defer in Content Moderation: The Human-AI Interplay," arXiv:2402.12237v3 [cs.LG] Jun. 2, 2024, 71 pages.

* cited by examiner

ADAPTIVE WINDOW SCREENING FOR LARGE TEXT CONTENT SECURITY

TECHNICAL FIELD

This disclosure relates generally to systems and methods for screening electronic text for content security issues, and more particularly to detecting and remediating content security issues in long electronic text passages.

DESCRIPTION OF RELATED ART

The screening of user generated text for security issues is necessary in many contexts. For example, users of social media, online forums, and other websites may create and post content that includes materials considered obscene, illegal, harmful, or insulting or otherwise inappropriate. In another example, users may submit malicious text in an attempt to undermine computer system security, such as a prompt injections in which a user attempts to cause a machine learning model (such as a Large Language Model (LLM)) to ignore its initial instructions through malicious prompts. The detection and remediation of problematic content in user generated text, e.g., for content moderation or prompt injection (or other similar cyber-attacks), is necessary to ensure a safe environment for other users as well as the computer system itself.

Traditional screening of text, e.g., for content moderation or to detect prompt injection, suffers from inefficiencies when screening long text passages, as they conventionally operate on a fixed and typically short text length, e.g., window. The short text window is slid over the entire text, e.g., as a "sliding window," and each small text segment is analyzed for the targeted security issues, e.g., obscene, illegal, or harmful content or prompt injections, resulting in intensive processing time and power consumption. Moreover, typically, only a small amount of screened text, e.g., less than 1%, may include problematic content that the system will alert on. With the advent of more advanced LLMs capable of generating and understanding extended passages, the need for a more efficient screening process has become increasingly evident.

SUMMARY

Systems and methods are disclosed for detecting and remediating safety issues in electronic text received by an electronic platform. The electronic text is screened using a variable text window that is used to split the electronic text into segments. Each segment is tested for safety issues, e.g., for content moderation or computer security. Segments that are identified as containing potential safety issues are iteratively split and tested using progressively smaller window sizes. The testing of the segments may use a content safety model, such as a content moderation model or security model, that generates a safety score, which is compared to an adaptive threshold. The adaptive threshold, for example, is variable and may be adjusted based on the narrowing of the window size during each iteration. The dynamic screening approach may continue until a stop criterion is reached, such as all segments are determined to be safe or a minimum window size has been reached. The electronic text may then be accepted or rejected for use with the electronic platform based on the safety scores for the segments of the electronic text.

One innovative aspect of the subject matter described in this disclosure can be implemented as a computer-implemented method for detecting safety issues in electronic text. The method includes receiving electronic text in an electronic platform, the electronic platform receives electronic text from a plurality of sources. The method further includes splitting the electronic text into a plurality of segments with a window size and testing each segment for safety issues. Testing each segment includes determining a safety score for each segment in the plurality of segments with a content safety model and identifying any segments with potential safety issues based on the safety score for each segment. The method further includes iteratively splitting any segment with potential safety issues with progressively smaller window sizes and testing each segment for the potential safety issues. The method further includes accepting the electronic text or rejecting the electronic text for the electronic platform based on the safety scores for the segments of the electronic text.

An innovative aspect of the subject matter described in this disclosure can be implemented in a system for detecting safety issues in electronic text. The system includes one or more processors and a memory storing instructions that, when executed by the one or more processors, causes the system to perform operations. The operations performed by the system include receiving electronic text in an electronic platform, the electronic platform receives electronic text from a plurality of sources. The operations further include splitting the electronic text into a plurality of segments with a window size and testing each segment for safety issues. Testing each segment includes determining a safety score for each segment in the plurality of segments with a content safety model and identifying any segments with potential safety issues based on the safety score for each segment. The operations further include iteratively splitting any segment with potential safety issues with progressively smaller window sizes and testing each segment for the potential safety issues. The operations further include accepting the electronic text or rejecting the electronic text for the electronic platform based on the safety scores for the segments of the electronic text.

This Summary is provided to introduce in a simplified form a selection of concepts that are further described below in the Detailed Description. This Summary is not intended to identify key features or essential features of the claimed subject matter, nor is it intended to limit the scope of the claimed subject matter. Moreover, the systems, methods, and devices of this disclosure each have several innovative aspects, no single one of which is solely responsible for the desirable attributes disclosed herein.

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

Like numbers reference like elements throughout the drawings and specification.

DETAILED DESCRIPTION

Figure 1:
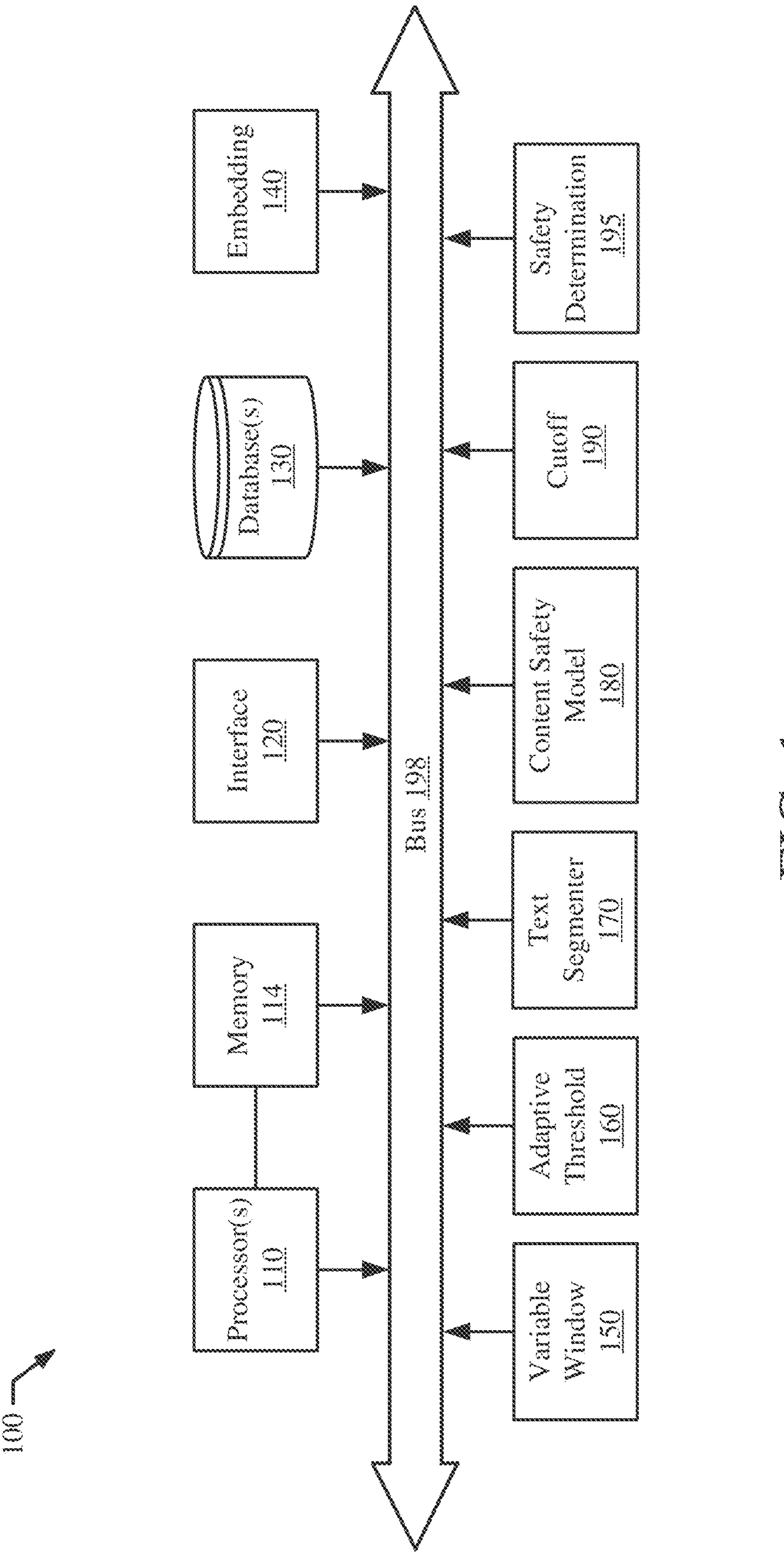
FIG. 1 shows an example system configured for electronic text screening and remediation, according to some implementations.

Implementations of the subject matter described in this disclosure may be used for screening electronic text, and in particular, large electronic text, generated by users of an electronic platform for safety issues. The electronic text, for example, may be screened for content moderation, e.g., to filter prohibited content, before publishing the material. In another example, the electronic text may be screened for malicious content intended to exploit-code based vulnerabilities of the electronic platform, such as prompt injection or spoofing attacks.

Typical text screening, e.g., for content moderation or security, uses a window with a fixed size to produce a plurality of segments, typically with short lengths. The analysis of the segments may be performed, e.g., using text classification models that classifies each text segment into predefined categories, e.g., classify whether the text segment includes unsafe content, e.g., for content moderation or security purposes. The size of the fixed window is selected, for example, based on a trade-off on processing resources and time requirements and the accuracy of the screening. The use of window size that produces a short text length, for example, may increase accuracy, and thus, safety, but results in intensive processing time and power consumption. For example, screening large text input, e.g., thousands or hundreds of thousands of tokens, which may equate to a million or more words, using a conventional window with a fixed size to produce a plurality of segments, typically with short lengths, which are each screened for, e.g., content moderation or security, may require extensive processing resources, power consumption, and time requirements.

As such, it would be beneficial for a text screening process to adjust the window size used for screening to improve the processing time and reduce power consumption, while retaining the high accuracy desired for ensuring safe content in electronic text submitted to an electronic platform by unknown sources.

As described herein, electronic text is screened using an adaptive text window that progressively narrows the focus on text segments that contain potentially unsafe content. The electronic text to be screened, in some implementations, may be large, e.g., thousands or hundreds of thousands of tokens, which may equate to a million or more words. The size of the adaptive text window, for example, may be initially large, which is used to split the electronic text into a plurality of text segments with relatively long text lengths, which are analyzed for unsafe content. The analysis of the text segments for potentially unsafe content may be performed by any desired content moderation or security algorithm. If any segment is identified as containing potentially unsafe content, the adaptive text window size is decreased, and segments with potentially unsafe content are split into further segments with relatively shorter text lengths, which are then analyzed for unsafe content. By way of example, the size of the adaptive text window may be configured to halve the text to be screened in each iteration, e.g., until a preset window size is reached, e.g., 100 words. Other window size reduction schemes, however, may be employed, including splitting the text into a number of segments in each iteration, where the number of segments may be determined based on contextual information, such as the total length of the electronic text, the type of electronic text, semantics, or grammatical information, and the generated segments may or may not overlap with other segments being screened or portions of text that have already been identified as safe. The dynamic screening approach may use a variable threshold to identify potentially unsafe content, which may be tailored to the window size, i.e., the threshold used to identify potentially unsafe content in segments having longer text lengths is different than the threshold used to identify potentially unsafe content in segments having shorter text lengths. The variable thresholds may be fine-tuned by domain experts or may be driven by machine learning models. The iterative screening process continues, for example, until all analyzed segments are determined to be safe, i.e., no potential unsafe content is identified in any segment, or until a minimum window size is reached. In some implementations, an additional unsafe threshold may be used to identify any segment that is presumed to be unsafe, and the screening process may conclude upon identification of any segment that includes content presumed to be unsafe. The electronic text may be accepted for use with the electronic platform, e.g., for publication, for use as a query for an LLM, etc., if no unsafe content is identified, or remedial action undertaken if unsafe content is identified, e.g., rejecting the text, labeling the text, flagging the text for further review, etc.

Various implementations of the subject matter disclosed herein provide one or more technical solutions to the detection and remediation of safety issues in electronic text. As such, various aspects of the present disclosure provide a unique computing solution to a unique computing problem that exists due to the need to accurately screen electronically submitted text from multiple unknown and untrusted users for safety issue and appropriately remediate any detected issues, while reducing processing resources and time requirements. The use of an adaptive text window that progressively narrows the focus for splitting and testing text segments in the electronic text that contain potentially unsafe content, as described herein, cannot be performed in the human mind, much less practically in the human mind, including the use of pen and paper.

FIG. 1 shows an example system 100 for electronic text screening and remediation, according to some implementations. The system 100 includes a combination of one or more processors 110, a memory 114 coupled to the one or more processors 110, an electronic interface 120, one or more databases 130, a text embedding model 140, a variable window 150, an adaptive threshold 160, a text segmenter 170, a content safety model 180, a cutoff 190, and a safety determination module 195. The system 100 may operate as an electronic platform, e.g., by being configured as a server for or a remote system for accessing a server hosting a webpage or website social media, online forums, and other websites. In other implementations, the system 100 may host or otherwise may be connected to an LLM or other generative artificial intelligence system. In some implementations, the various components of the system 100 may be interconnected by at least a data bus 198, as depicted in the example of FIG. 1. In other implementations, the various components of the system 100 may be interconnected using other suitable signal routing resources.

The processor 110 may include one or more suitable processors capable of executing scripts or instructions of one or more software programs stored in system 100 (such as within the memory 114). For example, the processor 110 may be capable of executing one or more applications, such as a server for social media, online forums, and other websites or as host or query services for an LLM. The processor 110 may be capable of executing the text embedding model 140, the variable window 150, the adaptive threshold 160, the text segmenter 170, the content safety model 180, the cutoff 190, and the safety determination module 195. The processor 110 may include a general purpose single-chip or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. In one or more implementations, the processors 110 may include a combination of computing devices (such as a combination of a DSP and a microprocessor, a plurality of microprocessors, one or more microprocessors in conjunction with a DSP core, or any other such configuration). In some implementations, the processor 110 incorporates one or more graphics processing units (GPUs) and/or tensor processing units (TPUs), such as for processing a large amount of data.

The memory 114, which may be any suitable persistent memory (such as non-volatile memory or non-transitory memory) may store any number of software programs, executable instructions, machine code, algorithms, and the like that can be executed by the processor 110 to perform one or more corresponding operations or functions. For example, the memory 114 may store one or more applications, the text embedding model 140, the variable window 150, the adaptive threshold 160, the text segmenter 170, the content safety model 180, the cutoff 190 that may be executed by the processor 110. The memory 114 may also store inputs, outputs, or other information associated with the components 140-195 of the system 100 or any other data for operation of the system 100. In some implementations, hardwired circuitry may be used in place of, or in combination with, software instructions to implement aspects of the disclosure.

The interface 120 may be one or more input/output (I/O) interfaces for transmitting or receiving (e.g., over a communications network) transmissions, input data, and/or instructions to or from a computing device of a user, outputting data (e.g., over the communications network) to the computing device of the user, providing an input interface for the user and outputting results to the computing device of the user, and the like. The interface 120 may receive electronic text from one or more users via a communications network, and may provide a report of a rejection of electronic text to the submitting user. The interface 120 may also receive or provide inputs or outputs for continued operation of the system 100. An example interface may include a wired interface or wireless interface to the internet or other means to communicably couple with other devices. In some implementations, the interface 120 may include an interface with an ethernet cable or a wireless interface to a modem, which is used to communicate with an internet service provider (ISP) directing traffic to and from other devices. For example, the system 100 may be remote to a user device for a user interacting with an electronic platform, such as a program to host or to access a host a server for a webpage or LLM and may receive electronic text from the user device to perform an action with the electronic platform, e.g., publication or querying. As another example, the interface 120 may be used to transmit one or more results over the communications network to the computing device associated with the user or other remote computer systems. The interface 120 may also be used to provide or receive other suitable information, such as computer code for updating one or more programs stored on the system 100, internet protocol requests and results, or the like. In some implementations, the interface 120 is also used to communicate with another device within the network to which the system 100 is coupled, such as a smartphone, a tablet, a personal computer, or other suitable electronic device. In various implementations, the interface 120 includes a display, a speaker, a mouse, a keyboard, or other suitable input or output elements that allow interfacing with the system 100 by a local user or moderator.

The database 130 may store the electronic text obtained via the interface 120, any inputs received from a user device or another device via the interface 120, the text segments generated by the text segmenter 170, the embeddings generated by the text embedding model 140, the initialized and current sizes of the windows generated by variable window 150, the initialized and current thresholds generated by the adaptive threshold 160, the safety scores generated for each segment individually and/or collectively by the content safety model, the status of the stop criterion of the cutoff 190, and the results, e.g., acceptance or rejection, of the safety determination module 195. The database 130 may also store hyperparameters configured for any models used in the components 140-195 or other computer executable instructions or data for operation of the system 100. In some implementations, the database 130 may include a relational database capable of presenting information (such as the text segment associations and categorizations or safety scores by the content safety model 180 for those text segments) as data sets in tabular form and capable of manipulating the data sets using relational operators. The database 130 may use Structured Query Language (SQL) for querying and maintaining the database 130.

The variable window 150 is to select the current window size for segmenting the electronic text in each screening iteration. The variable window 150 is configured to use the largest window size for the initial screening of the electronic text, and to progressively decrease the size of the window for each subsequent screening. The variable window 150 may be further configured with a minimum window size. The variable window 150, for example, may be initialized to a fixed maximum and minimum window size or with a starting and ending window size. In other words, for the initial and ending screening iterations, and for each screening iteration in between, the window sizes may be selected based on a fixed token size, fixed character size, or any other suitable segment size. In some implementations, the window sizes may be based at least partially on contextual information, such as the total length of the electronic text, the type of electronic text, semantics, or grammatical information, e.g., the window size may be based on sentence lengths, sentence clause lengths, etc. Additionally, the variable window 150 may be configured with the step size for decreasing the window after each screening iteration. The step size, for example, may be a fixed amount or percentage relative to the window size used in the preceding iteration. In some implementations, the step size may decrease linearly with each screening iteration, while in other implementations, the step size may decrease non-linearly with each screening iteration, e.g., to ensure there is sufficient contextual information in text segments in the later iterations. Moreover, in some implementations, the variable window 150 may be configured to adjust the step size used for decreasing the window based on contextual factors, such as the safety score for each segment or a combined safety score for multiple segments.

In some implementations, the same or different window sizes may be used with different segments in the same screening iteration.

The adaptive threshold 160 is to select and apply the threshold to identify potentially unsafe content based on the safety score of each segment of electronic text in each screening iteration. The adaptive threshold 160 may be initialized with an initial (starting) threshold for detecting potentially unsafe content, which may be altered with each screening iteration. In each screening iteration, the threshold selected by adaptive threshold 160 may be based on the size of the window. In some implementations, the threshold selected by the adaptive threshold 160 may be based on additional or different parameters, such as contextual information including the type of electronic text, the safety score for each segment, or a combined safety score for multiple segments. The adaptive threshold 160 may compare the current threshold to the safety score generated by the content safety model 180 for each segment, to determine whether the segment includes potentially unsafe content. In some implementations, the adaptive threshold 160 may select additional thresholds, such as an unsafe threshold to be applied to identify presumably unsafe content based on the safety score of each segment of electronic text in each screening iteration. A segment with presumably unsafe content, for example, may be treated as unsafe and no further screening iterations of such a segment are necessary. The unsafe threshold, for example, may be varied in each screening iteration, e.g., based on the window size and/or additional contextual information, such as the safety score for each segment, or a combined safety score for multiple segments. The adaptive threshold 160 may compare the current unsafe threshold to the safety score generated by the content safety model 180 for each segment, to determine whether the segment includes presumably unsafe content.

The text segmenter 170 is to segment electronic text (such as long text obtained by the interface 120) into text segments of a size that is based on the current window size selected by the variable window 150. The text segmenter 170 may include a tokenizer (or alternatively the tokenizer may be a separate component of the system 100) to tokenize the electronic text into tokens for segmentation. As such, in some implementations, the text segmenter 170 may tokenize and segment long text into a plurality of sentence-long text segments based on the current window size selected by the variable window 150. In some other implementations, the text embedding model 140 may perform the tokenization, and the text segmenter 170 may segment the text based on window length but leave the characters without tokenizing. Each text segment may overlap with any preceding and any following text segment by some percentage, e.g., 10%, 15%, 20%, 25% or more. Moreover, in some implementations, the amount of overlap with preceding and following text segments may be at least partially based on the current window size. In some implementations, the text segmenter 170 may overlap text segments with at least a portion of text segments that have been identified as being safe.

The text embedding model 140, for example, may be part of the text segmenter 170 or may be a separate component, and is to generate an embedding from a text segment. For example, a sentence output by the text segmenter 170 may be provided to the text embedding model 140 as an input, and the text embedding model 140 may generate a token vector representing the sentence. In some implementations, the embeddings may be of a fixed length (such as a token vector of, e.g., 128 values), e.g., based on the current window size, with the window size being a model parameter of the text embedding model. To note, the model parameter may be fixed (such as hard coded into the model) or adjustable (such as a parameter that may be defined by a user). The text embedding model 140 may also normalize the generated embeddings. If the embeddings are normalized, the embeddings are able to be compared to each other (such as to calculate a distance between embeddings, such as described herein with reference to the content safety model 180).

In some implementations, the text embedding model 140 may be a natural language processor (NLP) configured to tokenize and vectorize the input text to generate a normalized embedding. For example, the text embedding model 140 may include a bidirectional encoder representations from Transformers (BERT) model, or may include any suitable variant of the BERT model, such as a robustly optimized BERT pretraining approach (RoBERTa) model, a lite version of BERT (ALBERT) model, a distilled version of BERT (DistilBERT) model, and so on. Alternatively, a different suitable NLP may be used to generate the embeddings from the text input. As such, the text embedding model 140 generates an embedding for each text segment of a long text, with each text segment being provided as an input to the content safety model 180.

The content safety model 180 may be any suitable machine learning (ML) based model for determining a safety score for each segment. In some implementations, the content safety model 180, for example, may be a model configured for content moderation. In some implementations, the content safety model 180, for example, may be a model configured for security analysis of input text. In some implementations, the content safety model 180 may be a text classification model that classifies each segment with a safety score. For example, the content safety model 180 may be a decision tree classifier, which may include any suitable variant of a decision tree, including a random forest, boosted decision trees (e.g., XGBoost), bagged decision trees, and so on. In some other implementations, the content safety model 180 includes another classification model, such as support vector machines (SVMs), a model based on Naïve Bayes, and so on. The content safety model 180 may be configured to receive a text segment as an input and may generate a categorization, e.g., safety score, for the text segment. The content safety model 180 may also be configured to generate a categorization, e.g., safety score, for the overall text, based on the categorizations of all text segments. For example, the content safety model 180 (such as a decision tree classifier) may include post-processing of the text segment categorizations across the overall text to generate a categorization of the overall text (such as by ORing the categorizations or otherwise combining the categorizations). For example, if the content safety model 180 generates a safety score for a text segment indicating the likelihood that the segment includes potential unsafe content, the content safety model 180 may include a combinatorial logic for the text segments that generates an aggregated or combined safety score for all of the text segments.

The cutoff 190 is to apply a stop algorithm for the iterative screening process. The cutoff 190, for example, determines whether a stop criterion has been reached. The cutoff 190, for example, may be configured to determine whether the minimum or ending window size has been reached during the screening iterations, indicating that no further iterations are to be performed. The cutoff 190, additionally, may be configured to determine whether no text segments were identified as including potentially unsafe content, indicating that no further iterations are necessary. Additionally, if an unsafe threshold is applied by the adaptive threshold 160 to identify any text segment that is presumed to be unsafe, the cutoff 190 may be configured to determine that a stop criterion has occurred if any text segment is identified as presumably unsafe.

The safety determination module 195 is to determine whether the content of the electronic text is considered safe and can be accepted by the electronic platform, or is unsafe and requires remediation. For example, the safety determination module 195 may be configured to determine the electronic text as safe if no text segment is identified as containing potentially unsafe content. The safety determination module 195, on the other hand, may determine the electronic text as not safe if, after all screening iterations have been completed, e.g., the minimum window size has been reached, and there are text segments that are identified as containing potentially unsafe content that remain. Additionally, in some implementations, the safety determination module 195 may be configured to determine that the electronic text is not safe if any text segment is identified as being presumably unsafe. In some implementations, the safety determination module 195 may determine whether the electronic text is safe based on safety scores for each separate textual segment. In some implementations, the safety determination module 195 may determine whether the electronic text is safe based on an aggregation or combination of safety scores for two or more textual segments. The safety determination module 195 may be configured to remediate any electronic text identified as unsafe, e.g., by rejecting the electronic text for use with the electronic platform. For example, if the electronic text is determined to be unsafe, remedial action may be performed, such as the rejecting or not publishing the text, publishing the text with a label identifying the potentially unsafe content, reporting the text for further review by administrators, etc. In some implementations, the safety determination module 195 may be configured to report the rejection of the electronic text to the user via electronic interface 120.

While the text embedding model 140, the variable window 150, the adaptive threshold 160, the text segmenter 170, the content safety model 180, the cutoff 190, and the safety determination module 195 are depicted as separate components of the system 100 in FIG. 1, the components 140-195 may be included in software including instructions stored in memory 114 or the database 130, may include application specific hardware (e.g., one or more ASICs), or a combination of the above. As such, the particular architecture of the system 100 shown in FIG. 1 is but one example of a variety of different architectures within which aspects of the present disclosure may be implemented. In addition, in other implementations, components of the system 100 may be distributed across multiple devices, may be included in fewer components, and so on. While the examples herein are described with reference to system 100, any suitable system may be used to perform the operations described herein. If the components are software, the components may be implemented using any suitable computer readable language. For example, each of the components 140-180 and the configuration and interoperability of such components may be programmed in the Python programming language using any suitable libraries.

Figure 2:
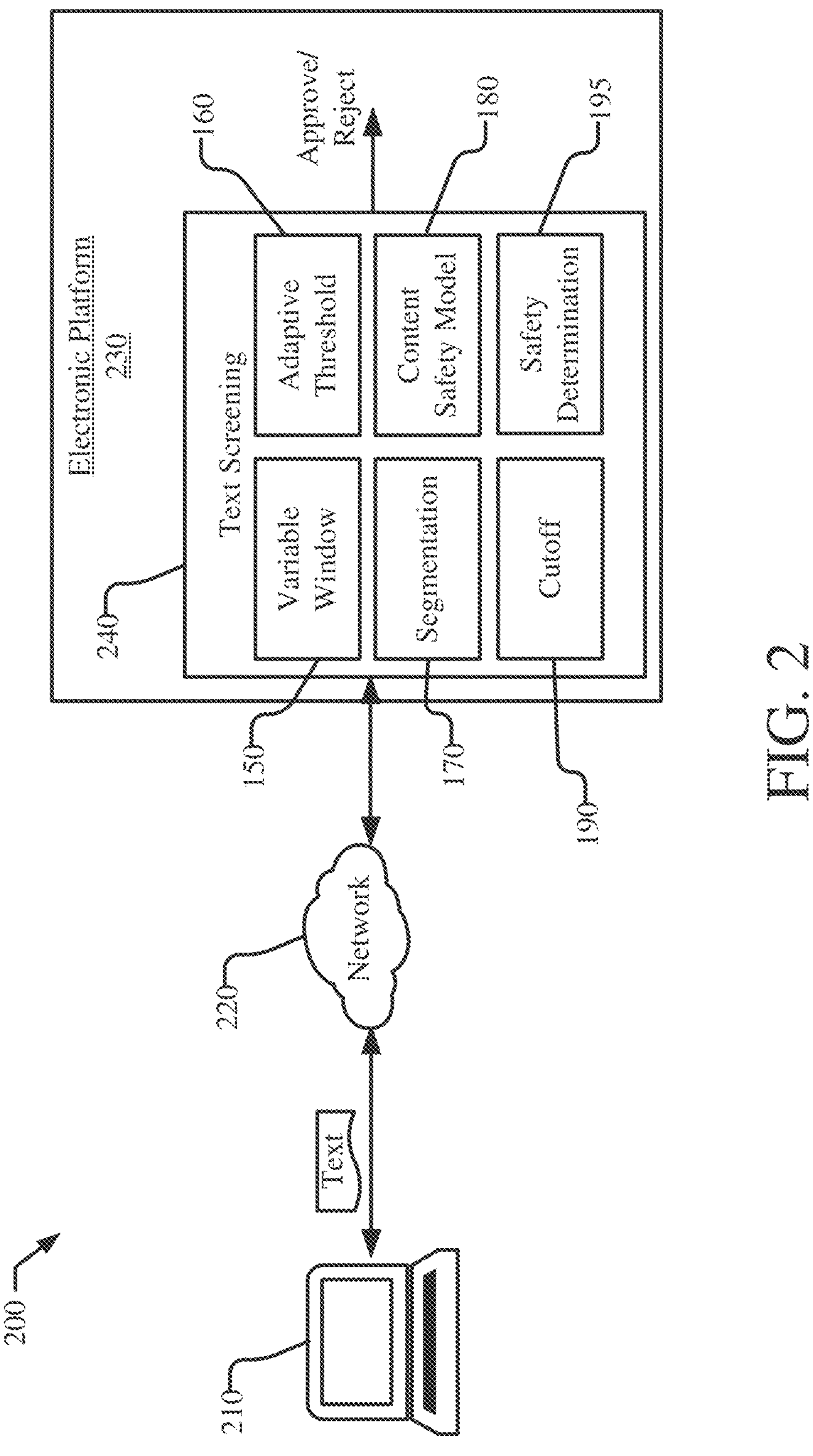
FIG. 2 shows an example block diagram of a system configured for electronic text screening and remediation, according to some implementations.

FIG. 2 shows an example block diagram 200 of a system configured for electronic text screening and remediation, according to some implementations. As illustrated, the block diagram 200 includes an electronic platform 230 that includes a text screening system 240 that includes example implementations of the variable window 150, the adaptive threshold 160, the text segmenter 170, the content safety model 180, the cutoff 190, and the safety determination module 195, which may be implemented in the system 100 depicted in FIG. 1. FIG. 2 is discussed below in combination with FIG. 3, which shows an illustrative flow chart of an example operation 300 of electronic text screening, according to some implementations. In the example implementation, the text screening is sometimes described as performing content moderation, but it should be understood that the text screening may be performed for security, e.g., to detect and remediate malicious content intended to exploit-code based vulnerabilities of the electronic platform, such as prompt injection or spoofing attacks.

At 310, the text screening system 240 receives electronic text. In some implementations, the electronic text may be large, e.g., thousands or hundreds of thousands of tokens, which may equate to a million or more words. As illustrated in FIG. 2, the electronic text may be provided to the electronic platform 230 by a user via the user's computer device 210 and network 220. The electronic text, for example, may be received via interface 120 shown in FIG. 1. In some implementations, the electronic text may be provided by the user, e.g., for publication to social media, online forums, and other websites, by the electronic platform 230. In some implementations, the electronic text may be provided by the user, e.g., for a query to an LLM or other generative artificial intelligence system hosted or accessed via electronic platform 230. The electronic text from the user may include unsafe content, such as obscene, illegal, harmful, or other content that would be inappropriate for the electronic platform to publish or otherwise make accessible to other users of the electronic platform, or malicious text submitted in an attack on the electronic platform 230.

At 320, the variables of the text screening system 240 are initialized. For example, the variable window 150 in FIG. 2 may be initialized to the starting, e.g., largest, window size for the initial pass through of the electronic text. In some implementations, the window size may be configured to split the electronic text into a predetermined number of segments in the initial pass. For example, the window size may halve the electronic text to be screened on the initial pass. In some implementations, the starting window size may be set to the largest window size that may be utilized by the content safety model 180, while in other implementations, the starting window size may be, at least partially, based on contextual information, such as the content of the electronic text, e.g., the length of the text and/or the type of text (e.g., text for publication or query), and/or the performance characteristics of the content safety model 180. The minimum window size that serves as the lower boundary during the adaptive screening process may be similarly initialized. By way of example, the minimum window size may be a predetermined number of tokens or words, e.g., 100 words, and may be based on contextual information, such as context related to the electronic text or the content safety model 180. In some implementations, the step size of the variable window may also be initialized. For example, the window size may be decreased so as to split the electronic text to be screened into a predetermined number of segments, which may be the same or may be different than the initial pass. In some implementations, the window size itself may be halved in each iteration. The size reduction of the window in each iteration may be the same in each iteration or may vary. The electronic text may be split into different numbers of segments in each iteration. The step size of the reduction of the window may be based on contextual information, such as context related to the electronic text or the content safety model 180. Further, the adaptive threshold 160 may be initialized with an initial (starting) threshold for detecting potentially unsafe content. In some implementations, the threshold used for detecting potentially unsafe content may be based on the window size, and thus, the initial threshold may be based on the starting window size. The adjustments to the threshold, e.g., how much the threshold changes with respect to decreasing window size, as well as other contextual factors, may also be initialized. Additional thresholds may be initialized as well, such as thresholds used for detecting presumably unsafe content. For example, potentially unsafe content may differ from presumably unsafe content in that potentially unsafe content indicates that additional screening of the text is warranted, while presumably unsafe content indicates that the text is to be treated as unsafe and no further screening is necessary.

At 330, the text segmenter 170 divides the electronic text into smaller segments based on the window size. The text segmenter 170, for example, segments the electronic text into a plurality of segments having a length that corresponds to the window size. In some implementations, the text segmenter 170 may divide the text into overlapping windows. For example, each text segment may overlap with any preceding and any following text segment by some percentage, e.g., 10%, 15%, 20%, 25% or more. In some implementations, the amount of overlap with preceding and following text segments may be at least partially based on the current window size. In some implementations, the text segmenter 170 may include an embedding model that generates embeddings for the plurality of segments or may receive the embeddings for the plurality of segments from a separate embedding model, e.g., embedding model 140. The embeddings may be generated iteratively, with the segments being provided to the embedding model in a one-by-one manner, or the embeddings may be generated concurrently (such as the model being a multiple input multiple output type model or multiple instances of the embedding model being used). In some implementations, the embedding model may be configured to generate a variable sized embedding, e.g., variable vector size, e.g., that corresponds to the window size, which is provided as input text for analysis. In some implementations, the text embedding model is a BERT model to generate embeddings.

At 340, each segment is analyzed by the content safety model 180 to determine a safety score for each segment. The content safety model 180 may be any suitable machine learning (ML) model for detecting undesired content in electronic text, e.g., for content moderation or security. For example, the content safety model 180 may be a text classification model such as a decision tree classifier, including any suitable variant of a decision tree, including a random forest, boosted decision trees (e.g., XGBoost), bagged decision trees, and so on. In some other implementations, the content safety model 180 may include another classification model, such as support vector machines (SVMs), a model based on Naïve Bayes, and so on. For example, in some implementations, the content safety model 180 may be configured to receive a text segment and a semantic as inputs in order to generate a categorization for the text segment. For example, the content safety model 180 (such as a decision tree classifier) may be trained to classify each text segment with a safety score indicative of a likelihood that the text segment includes potential unsafe content. In some implementations, the content safety model 180 may also be configured to generate a categorization of the overall text based on the categorizations of the text segments of the overall text. For example, the content safety model 180 may include post-processing of the text segment categorizations across the overall text to generate a categorization of the overall text (such as by combining the safety scores). For example, the content safety model 180 may include an aggregation operation across the classifications of all analyzed text segments to combine the safety scores for the overall text.

At 350, the safety score for each analyzed segment is compared to the current threshold by the adaptive threshold 160. For example, if a text segment has a safety score that is greater than the current threshold (Yes), the text segment is identified as containing potentially unsafe content, and otherwise (No) the text segment is identified as not containing potentially unsafe content. Any text segments identified as not containing potentially unsafe content are considered safe and no further screening of these text segments is required, as illustrated by the processes flowing to 380 for these text segments. On the other hand, for each text segment identified as containing potentially unsafe content, the process may continue iteratively with further segmentation using progressively smaller windows and analysis using adapted thresholds until a cut-off is reached. In some implementations, the safety score may be compared to additional thresholds, such as a threshold for detecting presumably unsafe content.

At 360, for example, the cutoff 190 determines whether a stop criterion has been reached. The stop criterion, as applied by the cutoff 190, for example, may be whether the minimum window size, e.g., initialized in 320, has been reached. Additionally, if an additional unsafe threshold is used to identify any text segment that is presumed to be unsafe, a stop criterion may include whether any text segment is identified as presumably unsafe. If a stop criterion has been reached (Yes), no further screening iterations are performed and the processes flows to 380 for any remaining text segments. On the other hand, if a stop criterion has not been reached (No), the iterative process continues, as illustrated by the process flowing to 370.

At 370, for example, if the cutoff determines that a stop criterion has not been reached (No), the iterative screening process continues by progressively reducing the window size by the variable window 150. The reduction in the window size, for example, may be based on the step size of the variable window initialized in 320. In some implementations, the step size for the reduction of the variable window may be a fixed amount or fixed percentage. In some implementations, the step size for the reduction of the variable window may be determined based on the current safety score or scores for the remaining text segments. For example, if a text segment has a safety score that greatly exceeds the threshold, e.g., indicating that the segment more likely contains unsafe content, the window size may be reduced more than for a safety score that only slightly exceeds the threshold, e.g., indicating that the segment is less likely to contain unsafe content. The variable step size for the reduction in window size may be based on fixed rules or formulas or may be determined by a machine learning model, which may consider additional contextual factors, such as the type of content or classification of the unsafe content. Additionally, the one or more thresholds may be adjusted, e.g., based on the new window size, e.g., as initialized at 320. In some implementations, the adjustment to the thresholds may be based on fixed rules or formulas or may be determined by a machine learning model, which may consider additional contextual factors, such as the type of content or classification of the unsafe content.

The process flows back to 330, where the text segmenter 170 divides the remaining text segments, i.e., any text segments that were identified as containing potentially unsafe content, into smaller segments based on the new window size. Splitting the segments into smaller sizes enables a more granular assessment of the text. As discussed above, in some implementations, the text segmenter 170 may divide any text segment into overlapping windows so that each text segment overlaps with any preceding and any following text segment by some percentage. The amount of overlap with preceding and following text segments may be at least partially based on the current window size. Additionally, in some implementations, the amount of overlap with preceding and following text segments may be based on fixed rules or formulas or may be determined by a machine learning model, which may consider additional contextual factors, such as the type of content or classification of the unsafe content. Additionally, in some implementations, remaining text segments, i.e., text segments that were identified as containing potentially unsafe content, may be divided using windows that overlap with a portion of the text segments that are not identified as containing potentially unsafe content. The use of windows that overlap with other segments, including segments that were not identified as containing potentially unsafe content, provides context information for the analysis of the smaller text segments.

The process continues at 340, where each segment is analyzed by the content safety model 180 to determine a safety score for each segment, the comparison to the one or more adjusted thresholds at 350, and the cutoff determination at 360. The process continues iteratively, with new, smaller segments produced by decreasing the window size progressively, and adjusting the one or more thresholds, until no segment is identified as containing potentially unsafe content, i.e., (No) at 350 for all segments, or a stop criterion is reached by cutoff 190 at 360.

At 380, the safety determination module 195 determines whether the content of the electronic text is considered safe, and therefore may be accepted by the electronic platform 230, or is considered unsafe, and therefore is rejected by the electronic platform. The safety determination module 195, for example, may determine the electronic text as safe if no segment is identified as containing potentially unsafe content, i.e., (No) at 350 for all segments. The safety determination module 195 may determine the electronic text as not safe if, after all iterations are completed, e.g., the minimum window size has been reached and text segments identified as containing potentially unsafe content remain. In some implementations, the safety determination module 195 may determine the electronic text as not safe if any text segment is identified as being presumably unsafe. In some implementations, the safety determination module 195 may determine whether the electronic text is safe based on safety scores for each separate textual segment. In some implementations, the safety determination module 195 may determine whether the electronic text is safe based on an aggregation or combination of safety scores for two or more textual segments. The safety determination module 195, thus, may accept or reject the electronic text. If the electronic text is accepted, the electronic platform 230 may use the electronic text, e.g., by publishing or accepting the text as an LLM query, etc. If the electronic text is rejected, the electronic platform 230 may undertake remedial action, such as rejecting or not publishing the text, publishing the text with a label identifying the potentially unsafe content, reporting the text for further review by administrators, etc. In some implementations, the electronic platform 230 may report the rejection of the electronic text to the user via electronic interface 120 and network 220, and the user's computer device 210.

Figure 3:
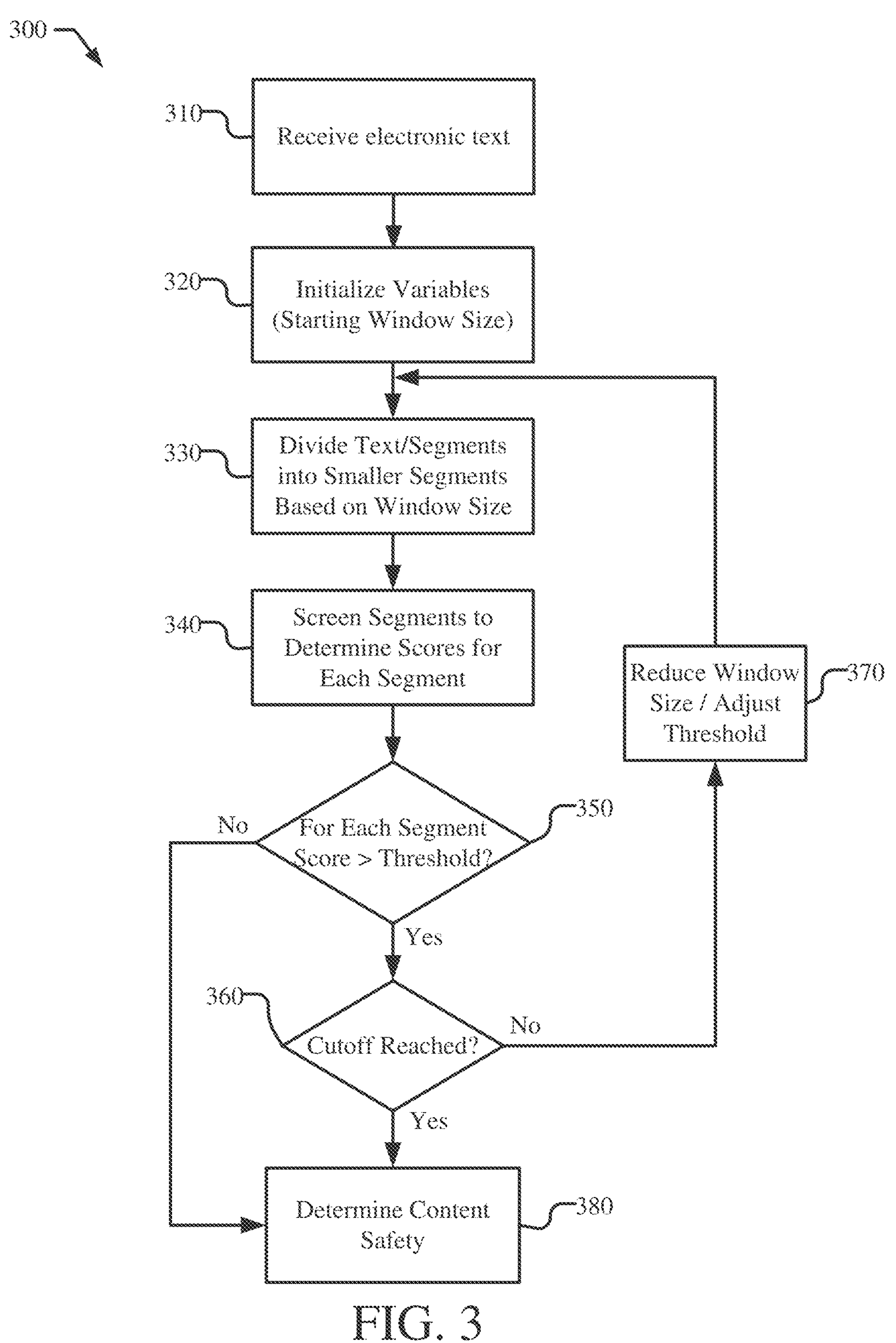
FIG. 3 shows an illustrative flow chart of an example operation of electronic text screening and remediation, according to some implementations.
Figure 4:
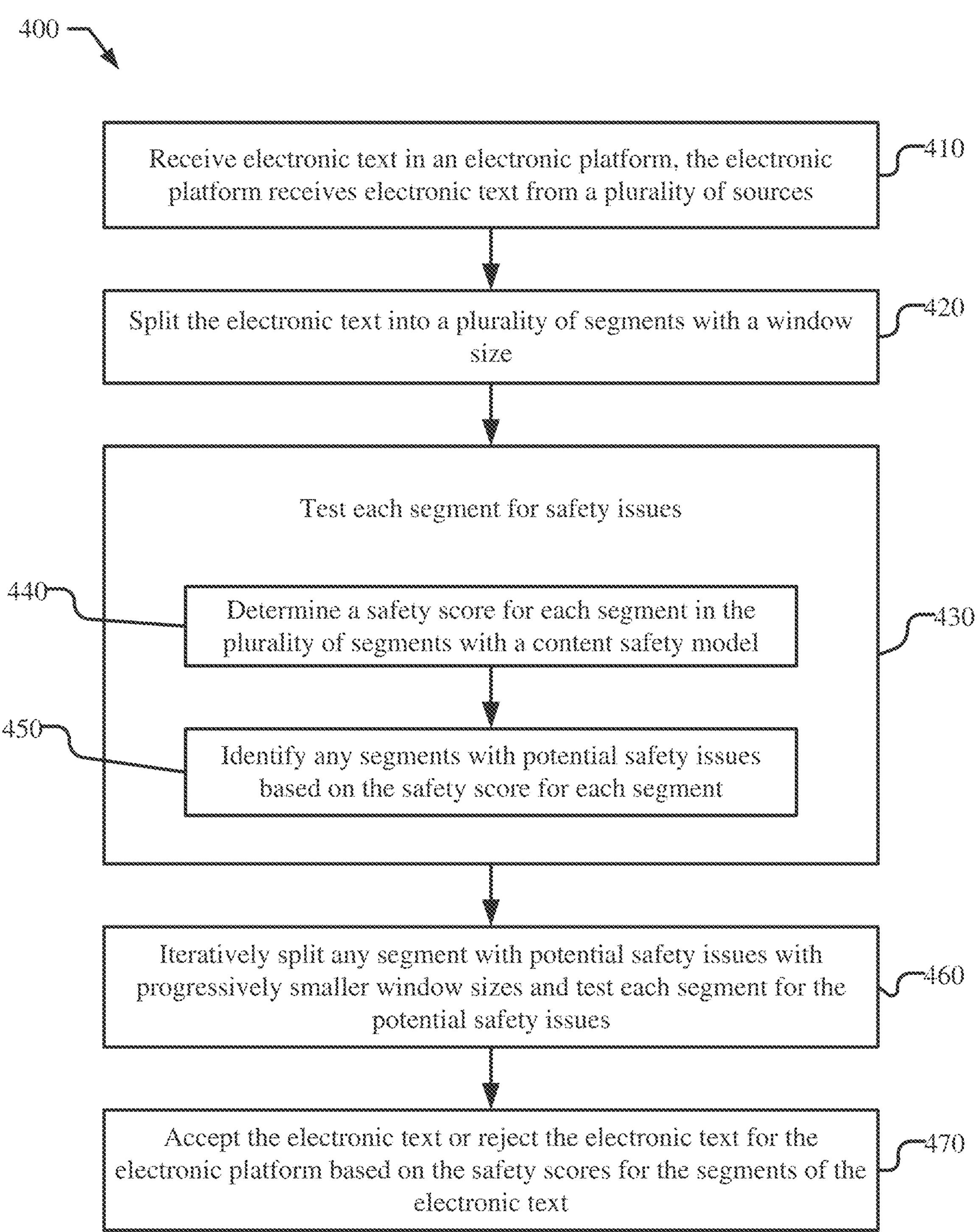
FIG. 4 shows an illustrative flow chart of an example method for detecting and remediating safety issues in electronic text, according to some implementations.

FIG. 4 shows an illustrative flow chart of an example method 400 for detecting and remediating safety issues in electronic text, according to some implementations. The electronic text, for example, may be received by an electronic platform from unknown or untrusted users, and may include safety issues, such as obscene, illegal, harmful, or other content that is inappropriate to be published or otherwise shared with other users of the electronic platform, or such as malicious content intended to exploit-code based vulnerabilities of the electronic platform. Accordingly, the electronic text requires screening to detect and remediate any safety issues present. Operations in method 400 are an example of implementations of operation 300 depicted in FIG. 3 and are described as being performed by the system 100 in FIG. 1 having the example configuration in block diagram 200 in FIG. 2, but other configurations may be used if desired.

At 410, the system 100 receives electronic text in an electronic platform. The electronic platform, for example, is configured to receive electronic text from a plurality of sources, e.g., via the electronic interface 120 shown in FIG. 1. As noted above, the sources of electronic text may be unknown or untrusted, and the electronic text may include safety issues, such as obscene, illegal, harmful, or other content that is inappropriate to be published or otherwise shared with other users of the electronic platform, or such as malicious content intended to exploit-code based vulnerabilities of the electronic platform.

At 420, the electronic text is split into a plurality of segments with a window size, e.g., as discussed in reference to block 330 in FIG. 3 and text segmenter 170 in FIGS. 1 and 2.

At 430, each segment is tested for safety issues, e.g., as discussed in reference to blocks 340 and 350 in FIG. 3 and content safety model 180 and adaptive threshold 160 in FIGS. 1 and 2.

At 440, the testing of each segment for potential safety issues includes determining a safety score for each segment in the plurality of segments with a content safety model, e.g., as discussed in reference to block 340 in FIG. 3 and content safety model 180 in FIGS. 1 and 2.

At 450, the testing of each segment for potential safety issues further includes identifying any segments with potential safety issues based on the safety score for each segment, e.g., as discussed in reference to block 350 in FIG. 3 and adaptive threshold 160 in FIGS. 1 and 2. In some implementations, any segments with potential safety issues may be identified by comparing the safety score for each segment to a safety threshold, and the system 100 may further adjust the safety threshold based on the window size in each iteration, e.g., as discussed in reference to blocks 320, 350 and 370 in FIG. 3 and adaptive threshold 160 in FIGS. 1 and 2. Additionally, the system 100 may further compare the safety score for each segment to an unsafe threshold that identifies segments as unsafe, and the iteratively splitting and testing is performed until any segment is identified as unsafe, e.g., as discussed in reference to blocks 320, 350, and 360 in FIG. 3 and adaptive threshold 160 and cutoff 190 in FIGS. 1 and 2. In some implementations, any segment that is not identified with potential safety issues is deemed safe and is not split in further iterations, e.g., as discussed in reference to blocks 350 and 380 in FIG. 3 and adaptive threshold 160 and safety determination module 195 in FIGS. 1 and 2.

At 460, the system 100 iteratively splits any segment with potential safety issues with progressively smaller window sizes and tests each segment for the potential safety issues, e.g., as discussed in reference to blocks 360, 370, 330, 340, and 350 in FIG. 3 and variable window 150, adaptive threshold 160, text segmenter 170, and content safety model 180 in FIGS. 1 and 2. In some implementations, iteratively splitting and testing is performed until no segments are identified with potential safety issues or a minimum window size is reached, e.g., as discussed in reference to blocks 350, 360, and 380 in FIG. 3 and adaptive threshold 160, and cutoff 190 in FIGS. 1 and 2.

At 470, the electronic text is accepted or rejected for the electronic platform based on the safety scores for the segments of the electronic text, e.g., as discussed in reference to block 380 in FIG. 3 and safety determination module 195 in FIGS. 1 and 2. In some implementations, the electronic text may be accepted or rejected for the electronic platform based on whether any segment is identified with potential safety issues after all iterations are performed, e.g., as discussed in reference to block 380 in FIG. 3 and safety determination module 195 in FIGS. 1 and 2. In some implementations, the electronic text may be accepted or rejected for the electronic platform based on an aggregate safety score for all segments, e.g., as discussed in reference to block 380 in FIG. 3 and safety determination module 195 in FIGS. 1 and 2.

In some implementations, splitting the electronic text into the plurality of segments and splitting any segment with potential safety issues with progressively smaller window sizes uses overlapping segments, e.g., as discussed in reference to block 330 and in FIG. 3 and text segmenter 170 in FIGS. 1 and 2.

In some implementations, splitting any segment with potential safety issues with progressively smaller window sizes may include overlapping the any segments with a portion of one or more segments that are not identified with potential safety issues, e.g., as discussed in reference to block 330 and in FIG. 3 and text segmenter 170 in FIGS. 1 and 2.

As used herein, a phrase referring to "at least one of" or "one or more of" a list of items refers to any combination of those items, including single members. As an example, "at least one of: a, b, or c" is intended to cover: a, b, c, a-b, a-c, b-c, and a-b-c, and "one or more of: a, b, or c" is intended to cover: a, b, c, a-b, a-c, b-c, and a-b-c. In addition, the term "document" may be used interchangeably with "electronic document" or "computer readable document" based on how used above.

The various illustrative logics, logical blocks, modules, circuits, and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices such as, for example, a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer readable medium. The processes of a method or algorithm disclosed herein may be implemented in a processor-executable software module which may reside on a computer readable medium. Computer readable media includes both computer storage media and communication media including any medium that can be enabled to transfer a computer program from one place to another. A storage media may be any available media that may be accessed by a computer. By way of example, and not limitation, such computer readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer readable media. Additionally, the operations of a method or algorithm may reside as one or any combination or set of codes and instructions on a machine readable medium and computer readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. For example, while the figures and description depict an order of operations to be performed in performing aspects of the present disclosure, one or more operations may be performed in any order or concurrently to perform the described aspects of the disclosure. In addition, or to the alternative, a depicted operation may be split into multiple operations, or multiple operations that are depicted may be combined into a single operation. Thus, the claims are not intended to be limited to the implementations shown herein but are to be accorded the widest scope consistent with this disclosure, the principles, and the novel features disclosed herein.

What is claimed is:

1. A computer-implemented method for detecting safety issues in electronic text, the method comprising:
 receiving electronic text in an electronic platform, the electronic platform receives electronic text from a plurality of sources;
 splitting the electronic text into a plurality of segments with a window size;
 testing each segment for safety issues, comprising:
  determining a safety score for each segment in the plurality of segments with a content safety model;
  identifying any segments with potential safety issues based on the safety score for each segment;
 iteratively splitting any segment with potential safety issues with progressively smaller window sizes and testing each segment for the potential safety issues; and
 accepting the electronic text or rejecting the electronic text for the electronic platform based on the safety scores for the segments of the electronic text.

2. The method of claim 1, wherein identifying any segments with potential safety issues comprises comparing the safety score for each segment to a safety threshold, the method further comprising adjusting the safety threshold based on the window size in each iteration.

3. The method of claim 2, further comprising comparing the safety score for each segment to an unsafe threshold that identifies segments as unsafe, wherein iteratively splitting and testing is performed until any segment is identified as unsafe.

4. The method of claim 1, wherein any segment that is not identified with potential safety issues is deemed safe and is not split in further iterations.

5. The method of claim 1, wherein iteratively splitting and testing is performed until no segments are identified with potential safety issues or a minimum window size is reached.

6. The method of claim 1, wherein accepting the electronic text or rejecting the electronic text for the electronic platform is based on whether any segment is identified with potential safety issues after all iterations are performed.

7. The method of claim 1, wherein accepting the electronic text or rejecting the electronic text for the electronic platform is based on an aggregate safety score for all segments.

8. The method of claim 1, wherein splitting the electronic text into the plurality of segments and splitting any segment with potential safety issues with progressively smaller window sizes uses overlapping segments.

9. The method of claim 1, wherein splitting any segment with potential safety issues with progressively smaller window sizes comprises overlapping the any segments with a portion of one or more segments that are not identified with potential safety issues.

10. A system for detecting safety issues in electronic text, the system comprising:
 one or more processors; and
 a memory storing instructions that, when executed by the one or more processors, causes the system to perform operations comprising:
  receiving electronic text in an electronic platform, the electronic platform receives electronic text from a plurality of sources;
  splitting the electronic text into a plurality of segments with a window size;
  testing each segment for safety issues, comprising:
   determining a safety score for each segment in the plurality of segments with a content safety model;
   identifying any segments with potential safety issues based on the safety score for each segment;
  iteratively splitting any segment with potential safety issues with progressively smaller window sizes and testing each segment for the potential safety issues; and
  accepting the electronic text or rejecting the electronic text for the electronic platform based on the safety scores for the segments of the electronic text.

11. The system of claim 10, wherein identifying any segments with potential safety issues is performed by comparing the safety score for each segment to a safety threshold, the operations further comprise adjusting the safety threshold based on the window size in each iteration.

12. The system of claim 11, the operations further comprise comparing the safety score for each segment to an unsafe threshold that identifies segments as unsafe, wherein iteratively splitting and testing is performed until any segment is identified as unsafe.

13. The system of claim 10, wherein any segment that is not identified with potential safety issues is deemed safe and is not split in further iterations.

14. The system of claim 10, wherein iteratively splitting and testing is performed until no segments are identified with potential safety issues or a minimum window size is reached.

15. The system of claim 10, wherein accepting the electronic text or rejecting the electronic text for the electronic platform is based on whether any segment is identified with potential safety issues after all iterations are performed.

16. The system of claim 10, wherein accepting the electronic text or rejecting the electronic text for the electronic platform is based on an aggregate safety score for all segments.

17. The system of claim 10, wherein splitting the electronic text into the plurality of segments and splitting any segment with potential safety issues with progressively smaller window sizes uses overlapping segments.

18. The system of claim 10, wherein splitting any segment with potential safety issues with progressively smaller window sizes comprises overlapping the any segments with a portion of one or more segments that are not identified with potential safety issues.

* * * * *